US008730640B2

(12) United States Patent
Penwell et al.

(10) Patent No.: US 8,730,640 B2
(45) Date of Patent: May 20, 2014

(54) DC PASS RF PROTECTOR HAVING A SURGE SUPPRESSION MODULE

(75) Inventors: Chris Penwell, Minden, NV (US); Karl C. Bartel, Gardnerville, NV (US)

(73) Assignee: Transtector Systems, Inc., Hayden, ID (US)

( * ) Notice: Subject to any disclaimer, the term of this patent is extended or adjusted under 35 U.S.C. 154(b) by 429 days.

(21) Appl. No.: 13/105,430

(22) Filed: May 11, 2011

(65) Prior Publication Data

US 2011/0279943 A1 Nov. 17, 2011

Related U.S. Application Data

(60) Provisional application No. 61/333,635, filed on May 11, 2010.

(51) Int. Cl.

| | |
|---|---|
| ***H01C 7/12*** | (2006.01) |
| ***H02H 1/00*** | (2006.01) |
| ***H02H 1/04*** | (2006.01) |
| ***H02H 3/22*** | (2006.01) |
| ***H02H 9/06*** | (2006.01) |

(52) U.S. Cl.
USPC .......................................... 361/119; 361/118

(58) Field of Classification Search
USPC ................................. 361/111, 117, 118, 119
See application file for complete search history.

(56) References Cited

U.S. PATENT DOCUMENTS

| | | | |
|---|---|---|---|
| 2,030,179 | A | 2/1936 | Potter |
| 3,167,729 | A | 1/1965 | Hall |
| 3,323,083 | A | 5/1967 | Ziegler |
| 3,619,721 | A | 11/1971 | Westendorp |
| 3,663,901 | A | 5/1972 | Forney, Jr. |
| 3,731,234 | A | 5/1973 | Collins |
| 3,750,053 | A | 7/1973 | LeDonne |
| 3,783,178 | A | 1/1974 | Philibert |
| 3,831,110 | A | 8/1974 | Eastman |
| 3,845,358 | A | 10/1974 | Anderson et al. |
| 3,944,937 | A | 3/1976 | Fujisawa et al. |
| 3,980,976 | A | 9/1976 | Tadama et al. |
| 4,046,451 | A | 9/1977 | Juds et al. |
| 4,047,120 | A | 9/1977 | Lord et al. |
| 4,112,395 | A | 9/1978 | Seward |

(Continued)

FOREIGN PATENT DOCUMENTS

| | | |
|---|---|---|
| CH | 675933 A5 | 11/1990 |
| JP | 08-066037 | 3/1996 |

(Continued)

*Primary Examiner* — Rexford Barnie
*Assistant Examiner* — Christopher Clark
(74) *Attorney, Agent, or Firm* — Snell & Wilmer LLP

(57) ABSTRACT

A surge suppressor device includes a first housing defining a first cavity, input and output conductors disposed in the first cavity of the first housing, a capacitor connected in series with the input conductor and the output conductor, a first spiral inductor having an inner edge connected to the input conductor and an outer edge and a second spiral inductor having an inner edge connected to the output conductor and an outer edge. The surge suppressor device further includes a second housing defining a second cavity and connected to the first housing, a feed-through connecting the first cavity to the second cavity, a non-linear protection device positioned in the second cavity of the second housing and a first electrical wire passing through the feed-through and connecting the outer edge of the first spiral inductor to the non-linear protection device.

20 Claims, 4 Drawing Sheets

(56) References Cited

U.S. PATENT DOCUMENTS

| | | | | |
|---|---|---|---|---|
| 4,262,317 | A | 4/1981 | Baumbach | |
| 4,356,360 | A | 10/1982 | Volz | |
| 4,359,764 | A | 11/1982 | Block | |
| 4,384,331 | A | 5/1983 | Fukuhara et al. | |
| 4,409,637 | A | 10/1983 | Block | |
| 4,481,641 | A | 11/1984 | Gable et al. | |
| 4,554,608 | A | 11/1985 | Block | |
| 4,563,720 | A | 1/1986 | Clark | |
| 4,586,104 | A | 4/1986 | Standler | |
| 4,689,713 | A | 8/1987 | Hourtane et al. | |
| 4,698,721 | A | 10/1987 | Warren | |
| 4,727,350 | A | 2/1988 | Ohkubo | |
| 4,952,173 | A | 8/1990 | Peronnet et al. | |
| 4,984,146 | A | 1/1991 | Black et al. | |
| 4,985,800 | A | 1/1991 | Feldman et al. | |
| 5,053,910 | A | 10/1991 | Goldstein | |
| 5,057,964 | A | 10/1991 | Bender et al. | |
| 5,102,818 | A | 4/1992 | Paschke et al. | |
| 5,122,921 | A | 6/1992 | Koss | |
| 5,124,873 | A | 6/1992 | Wheeler et al. | |
| 5,142,429 | A | 8/1992 | Jaki | |
| 5,166,855 | A | 11/1992 | Turner | |
| 5,170,151 | A | 12/1992 | Hochstein | |
| 5,278,720 | A | 1/1994 | Bird | |
| 5,321,573 | A | 6/1994 | Person et al. | |
| 5,353,189 | A | 10/1994 | Tomlinson | |
| 5,412,526 | A | 5/1995 | Kapp et al. | |
| 5,442,330 | A | 8/1995 | Fuller et al. | |
| 5,537,044 | A | 7/1996 | Stahl | |
| 5,611,224 | A | 3/1997 | Weinerman et al. | |
| 5,617,284 | A | 4/1997 | Paradise | |
| 5,625,521 | A | 4/1997 | Luu | |
| 5,667,298 | A | 9/1997 | Musil et al. | |
| 5,721,662 | A | 2/1998 | Glaser et al. | |
| 5,781,844 | A | 7/1998 | Spriester et al. | |
| 5,790,361 | A | 8/1998 | Minich | |
| 5,798,790 | A | 8/1998 | Knox et al. | |
| 5,844,766 | A | 12/1998 | Miglioli et al. | |
| 5,854,730 | A | 12/1998 | Mitchell et al. | |
| 5,953,195 | A | 9/1999 | Pagliuca | |
| 5,966,283 | A | 10/1999 | Glaser et al. | |
| 5,982,602 | A | 11/1999 | Tellas et al. | |
| 5,986,869 | A | 11/1999 | Akdag | |
| 6,054,905 | A | 4/2000 | Gresko | |
| 6,060,182 | A | 5/2000 | Tanaka et al. | |
| 6,061,223 | A | 5/2000 | Jones et al. | |
| 6,086,544 | A | 7/2000 | Hibner et al. | |
| 6,115,227 | A | 9/2000 | Jones et al. | |
| 6,137,352 | A | 10/2000 | Germann | |
| 6,141,194 | A | 10/2000 | Maier | |
| 6,177,849 | B1 | 1/2001 | Barsellotti et al. | |
| 6,226,166 | B1 | 5/2001 | Gumley et al. | |
| 6,236,551 | B1 | 5/2001 | Jones et al. | |
| 6,243,247 | B1 | 6/2001 | Akdag et al. | |
| 6,252,755 | B1 | 6/2001 | Willer | |
| 6,281,690 | B1 | 8/2001 | Frey | |
| 6,292,344 | B1 | 9/2001 | Glaser et al. | |
| 6,342,998 | B1 | 1/2002 | Bencivenga et al. | |
| 6,381,283 | B1 | 4/2002 | Bhardwaj et al. | |
| 6,385,030 | B1 | 5/2002 | Beene | |
| 6,394,122 | B1 | 5/2002 | Sibley et al. | |
| 6,421,220 | B2 | 7/2002 | Kobsa | |
| 6,502,599 | B1 | 1/2003 | Sibley et al. | |
| 6,527,004 | B1 | 3/2003 | Sibley et al. | |
| 6,535,369 | B1 | 3/2003 | Redding et al. | |
| 6,650,203 | B2 | 11/2003 | Gerstenberg et al. | |
| 6,721,155 | B2 | 4/2004 | Ryman | |
| 6,754,060 | B2 | 6/2004 | Kauffman | |
| 6,757,152 | B2 | 6/2004 | Galvagni et al. | |
| 6,782,329 | B2 | 8/2004 | Scott | |
| 6,785,110 | B2 | 8/2004 | Bartel et al. | |
| 6,789,560 | B1 | 9/2004 | Sibley et al. | |
| 6,814,100 | B1 | 11/2004 | Sibley et al. | |
| 6,816,348 | B2 | 11/2004 | Chen et al. | |
| 6,968,852 | B1 | 11/2005 | Sibley | |
| 6,975,496 | B2 | 12/2005 | Jones et al. | |
| 7,082,022 | B2 | 7/2006 | Bishop | |
| 7,092,230 | B2 | 8/2006 | Inauen | |
| 7,104,282 | B2 | 9/2006 | Hooker et al. | |
| 7,106,572 | B1 | 9/2006 | Girard | |
| 7,130,103 | B2 | 10/2006 | Murata | |
| 7,159,236 | B2 | 1/2007 | Abe et al. | |
| 7,221,550 | B2 | 5/2007 | Chang et al. | |
| 7,250,829 | B2 | 7/2007 | Namura | |
| 7,338,547 | B2 | 3/2008 | Johnson et al. | |
| 7,371,970 | B2 | 5/2008 | Flammer et al. | |
| 7,430,103 | B2 | 9/2008 | Kato | |
| 7,453,268 | B2 | 11/2008 | Lin | |
| 7,471,172 | B2 | 12/2008 | Holst et al. | |
| 7,507,105 | B1 | 3/2009 | Peters et al. | |
| 7,623,332 | B2 * | 11/2009 | Frank et al. | 361/119 |
| 7,808,752 | B2 | 10/2010 | Richiuso et al. | |
| 7,817,398 | B1 | 10/2010 | Maples | |
| 7,948,726 | B2 * | 5/2011 | Troemel et al. | 361/56 |
| 8,456,791 | B2 * | 6/2013 | Jones et al. | 361/119 |
| 2002/0167302 | A1 | 11/2002 | Gallavan | |
| 2002/0191360 | A1 | 12/2002 | Colombo et al. | |
| 2003/0062967 | A1 * | 4/2003 | Ritchey et al. | 333/81 R |
| 2003/0072121 | A1 * | 4/2003 | Bartel et al. | 361/119 |
| 2003/0211782 | A1 | 11/2003 | Esparaz et al. | |
| 2004/0042149 | A1 | 3/2004 | Devine et al. | |
| 2004/0121648 | A1 | 6/2004 | Voros | |
| 2004/0145849 | A1 | 7/2004 | Chang et al. | |
| 2004/0264087 | A1 | 12/2004 | Bishop | |
| 2005/0036262 | A1 | 2/2005 | Siebenthall et al. | |
| 2005/0044858 | A1 | 3/2005 | Hooker et al. | |
| 2005/0176275 | A1 | 8/2005 | Hoopes et al. | |
| 2005/0185354 | A1 | 8/2005 | Hoopes | |
| 2006/0038635 | A1 * | 2/2006 | Richiuso et al. | 333/177 |
| 2006/0120005 | A1 | 6/2006 | Van Sickle | |
| 2006/0139832 | A1 | 6/2006 | Yates et al. | |
| 2006/0146458 | A1 * | 7/2006 | Mueller | 361/56 |
| 2007/0053130 | A1 | 3/2007 | Harwath | |
| 2007/0095400 | A1 | 5/2007 | Bergquist et al. | |
| 2007/0097583 | A1 | 5/2007 | Harwath | |
| 2007/0139850 | A1 | 6/2007 | Kamel et al. | |
| 2009/0103226 | A1 | 4/2009 | Penwell et al. | |
| 2009/0109584 | A1 * | 4/2009 | Jones et al. | 361/56 |
| 2009/0284888 | A1 * | 11/2009 | Bartel et al. | 361/118 |
| 2009/0296430 | A1 | 12/2009 | Rieux-Lopez et al. | |
| 2011/0080683 | A1 * | 4/2011 | Jones et al. | 361/113 |
| 2011/0141646 | A1 * | 6/2011 | Jones et al. | 361/119 |
| 2011/0159727 | A1 | 6/2011 | Howard et al. | |

FOREIGN PATENT DOCUMENTS

| | | |
|---|---|---|
| JP | 11-037400 | 2/1999 |
| JP | 2003-070156 | 3/2003 |
| JP | 2003-111270 | 4/2003 |
| KR | 10-2003-0081041 | 10/2003 |
| KR | 1020090018497 | 2/2009 |
| WO | WO 9510116 | 4/1995 |
| WO | PCT/US03/17050 | 5/2003 |
| WO | WO 2011-119723 | 12/2011 |

* cited by examiner

DC PASS RF PROTECTOR HAVING A SURGE SUPPRESSION MODULE

CROSS REFERENCE TO RELATED APPLICATIONS

This patent application claims the benefit and priority of U.S. Provisional Application No. 61/333,635, filed on May 11, 2010, the entire contents of which are hereby incorporated by reference herein.

BACKGROUND

1. Field

The present invention generally relates to surge protectors and improvements thereof. More particularly, the present invention relates to RF protectors having surge suppression modules and improvements thereof.

2. Description of the Related Art

Communications equipment, computers, home stereo amplifiers, televisions and other electronic devices are increasingly manufactured using small electronic components that are vulnerable to damage from electrical energy surges. Surge variations in power and transmission line voltages, as well as noise, can change the operating frequency range of connected equipment and severely damage or destroy electronic devices. Electronic devices impacted by these surge conditions can be very expensive to repair or replace. Therefore, a cost effective way to protect these devices and components from power surges is needed.

Harmful electrical energy surges can originate from a variety of possible causes. One such cause is radio frequency (RF) interference that can couple to power or transmission lines from a multitude of sources. The power or transmission lines act as large antennas that may extend over several miles, thereby collecting a significant amount of RF noise from such sources as radio broadcast antennas. Another source of RF interference stems from equipment connected to the power or transmission lines that conducts along those lines to the equipment to be protected. A further cause of harmful electrical energy surges is lightning and typically arises when a lightning bolt strikes a component or transmission line that is coupled to the protected hardware or equipment. Lightning surges generally include DC electrical energy and AC electrical energy up to approximately 1 MHz in frequency and are complex electromagnetic energy sources having potentials estimated from 5 million to 20 million volts and currents reaching thousands of amperes.

Surge protectors protect electronic equipment from damage due to the large variations in the current and voltage resulting from lightning strikes, switching surges, transients, noise, incorrect connections or other abnormal conditions or malfunctions that travel across power or transmission lines. Ideally, an RF surge suppression device would have a compact size, a low insertion loss and a low voltage standing wave ratio (VSWR) that is capable of protecting hardware equipment from harmful electrical energy emitted from the above described sources.

SUMMARY

An apparatus for protecting hardware devices from surges is disclosed. In one embodiment, a DC pass RF surge protector may include a housing defining a cavity, a first and a second conductor positioned within the cavity of the housing, a capacitor positioned within the cavity and electrically connected between the first and the second conductor, a first spiral inductor positioned within the cavity of the housing and having an inner edge coupled to the first conductor and a non-linear protection device positioned outside the cavity of the housing and electrically connected to an outer edge of the first spiral inductor.

In another embodiment, a DC pass RF surge suppressor may include a first housing defining a first cavity having a central axis, input and output conductors disposed in the first cavity of the first housing and positioned substantially along the central axis, a capacitor connected in series with the input conductor and the output conductor, a first spiral inductor having an inner edge connected to the input conductor and an outer edge and a second spiral inductor having an inner edge connected to the output conductor and an outer edge. The DC pass RF surge suppressor further includes a second housing defining a second cavity and connected to the first housing, at least one feed-through for connecting the first cavity to the second cavity, a first surge protection element disposed in the second cavity of the second housing and connected to the outer edge of the first spiral inductor through the at least one feed-through and a second surge protection element disposed in the second cavity of the second housing and connected to the outer edge of the second spiral inductor through the at least one feed-through.

In still another embodiment, a DC pick-off and RF pass-through surge protector may include a housing defining a first cavity having a central axis and a second cavity in communication with the first cavity via a passageway, input and output conductors disposed in the first cavity of the housing and extending substantially along the central axis, a capacitor disposed in the first cavity and connected in-line between with the input conductor and the output conductor, a first spiral inductor disposed in the first cavity and having an inner radius connected to the input conductor and an outer radius and a second spiral inductor disposed in the first cavity and having an inner radius connected to the output conductor and an outer radius connected to the housing. The DC pick-off and RF pass-through surge protector further includes a surge protection device disposed in the second cavity of the housing and electrically connected to the outer radius of the first spiral inductor via the passageway.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
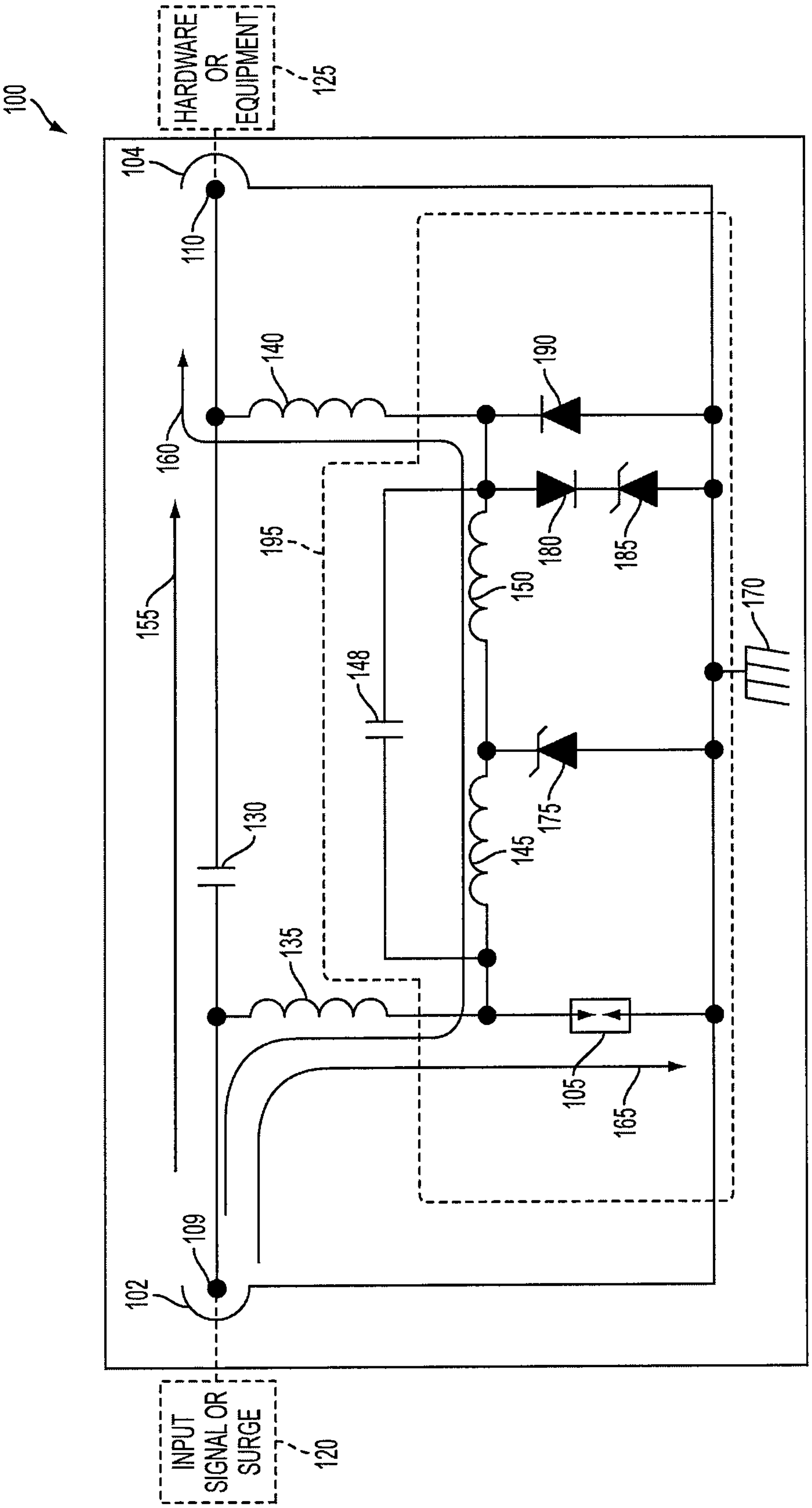
FIG. 1 is a schematic circuit diagram of a DC pass RF coaxial surge protector with a gas tube in accordance with an embodiment of the invention.

Referring now to FIG. 1, a schematic circuit diagram of a DC pass RF coaxial surge protector 100 is shown. The surge protector 100 protects hardware or equipment 125 connected to the surge protector 100 from an electrical surge 120 that could damage or destroy the hardware or equipment 125. The surge protector 100 includes a number of different electrical components, such as capacitors, inductors and diodes. For illustrative purposes, the schematic circuit diagram of the surge protector 100 will be described with reference to specific capacitor, inductor or diode values to achieve specific surge protection capabilities. However, other specific capacitor, inductor or diode values or configurations may be used to achieve other electrical or surge protection characteristics. Similarly, although the preferred embodiment is shown with particular capacitive devices, spiral inductors and gas tube suppression elements, it is not required that the exact elements described above be used in the present invention. Thus, the capacitive devices, spiral inductors and gas tubes are to illustrate various embodiments and not to limit the present invention.

The frequency range of operation for the surge protector 100 described by the schematic circuit diagram is between about 680 MHz and about 2.5 GHz. In one embodiment, the frequency range of operation is 680 MHz to 1.0 GHz, within which the insertion loss is specified less than 0.1 dB and the voltage standing wave ratio (VSWR) is specified less than 1.1:1. In another embodiment, the frequency range of operation is 1.0 MHz to 3.0 MHz (a telemetry band), within which the insertion loss is specified less than 0.4 dB and the VSWR is specified less than 1.4:1. The values produced above can vary depending on the frequency range, degree of surge protection and RF performance desired.

The surge protector 100 has two connection terminals including an input port 102 having an input center conductor 109 and an output port 104 having an output center conductor 110. The connection at the input port 102 and the output port 104 may be a center conductor such as a coaxial line with center pins as the input center conductor 109 and the output center conductor 110 for propagating DC currents and RF signals and an outer shield that surrounds the center pins. Moreover, the input port 102 may function as an output port and the output port 104 may function as an input port. By electrically connecting the surge protector 100 along a conductive path or transmission line between an input signal or power source and the connecting hardware or equipment 125, an electrical surge 120 present at the input port 102 that could otherwise damage or destroy the hardware or equipment 125 will instead dissipate through the surge protector 100 to ground, as discussed in greater detail herein. The protected hardware or equipment 125 can be any communications equipment, cell tower, base station, PC computer, server, network component or equipment, network connector or any other type of surge sensitive electronic equipment.

The surge protector 100 has various components coupled between the input center conductor 109 and the output center conductor 110, the components structured to form a desired impedance (e.g., 50Ω) and for providing various signal paths through the surge protector 100. These signal paths include an RF path 155, a DC path 160 and a main surge path 165. The RF path 155 includes the input center conductor 109, a DC blocking capacitor 130 and the output center conductor 110. During normal operations, RF signals travel across the RF path 155 to the hardware or equipment 125. The protected hardware or equipment 125 can receive or transmit RF signals along the RF path 155, thus the surge protector 100 can operate in a bidirectional RF manner. In the preferred embodiment, better surge performance is exhibited when operating in a unidirectional manner from the input port 102 to the output port 104.

The capacitor 130 is placed in series with the input center conductor 109 and the output center conductor 110 in order to block DC signals and undesirable surge transients. The capacitor 130 has a value between about 3 picoFarads (pF) and about 15 pF wherein higher capacitance values allow for better low frequency performance. Preferably, the capacitor 130 has a value of about 4.5 pF. The capacitor 130 is a capacitive device realized in either lumped or distributed form. Alternatively, the capacitor 130 can be realized by parallel rods, coupling devices, conductive plates or any other device or combination of elements which produce a capacitive effect. The capacitance of the capacitor 130 can vary depending upon the frequency of operation desired and the capacitor 130 will block the flow of DC signals while permitting the flow of AC signals depending on this chosen capacitance and frequency. At certain frequencies, the capacitor 130 may operate to attenuate the AC signal.

Although DC signals are thus prevented from traveling along the RF path 155, they can still be supplied through the surge protector 100 to the connecting hardware or equipment 125 via the DC path 160. The DC path 160 includes the input center conductor 109, a first spiral coil or inductor 135, a second spiral coil or inductor 140, intermediate coils or inductors 145 and 150 and the output center conductor 110. A DC signal on the input center conductor 109 travels outside of the RF path 155 and around the blocking capacitor 130 by propagating along the first spiral inductor 135, along the intermediate inductors 145 and 150 and along the second spiral inductor 140 where the DC signal travels to the output center conductor 110.

The main surge path 165 provides a path for the surge 120 to travel and dissipate to ground instead of propagating through to the connected hardware or equipment 125. Several electrical components 195 are additionally coupled between the input center conductor 109 and the output center conductor 110 for helping to mitigate the electrical surge 120 that may be present at the input port 102 of the surge protector 100. The electrical components 195 are mounted or integrated with a printed circuit board or a common ground base plate, the printed circuit board or base plate positioned within the surge protector 100 as described in greater detail in FIG. 2. The electrical components 195 include a gas tube 105, the intermediate inductors 145 and 150, a capacitor 148, zener diodes 175 and 185 and diodes 180 and 190. The gas tube 105 and the diode components (175, 185, 180 and 190) are coupled between a common ground 170 (e.g., a housing of the surge protector 100) and a node at some location along the DC path 160.

During a surge condition, the surge 120 is blocked by the blocking capacitor 130 and is routed through the first spiral inductor 135. The surge 120 flows along the main surge path 165 from the input center conductor 109, along the first spiral inductor 135 and across the gas tube 105. Auxiliary surge paths exist through the diode components (175, 185, 180 and 190) to the ground 170 (e.g., a housing of the surge protector 100), as discussed in greater detail herein.

The gas tube 105 contains hermetically sealed electrodes that ionize gas during use. When the gas is ionized, the gas tube 105 becomes conductive and the breakdown voltage is lowered. The breakdown voltage varies and is dependent upon the rise time of the surge 120. Therefore, depending on the characteristics of the surge 120, several microseconds may elapse before the gas tube 105 becomes ionized and hence conductive. Thus, the leading portion of the surge 120 passes to the intermediate inductors 145 and 150 instead of passing through the gas tube 105. The capacitor 148 connected in parallel across the intermediate inductors 145 and 150 is used as a low frequency bypass capacitor for the tuning of telemetry signals.

At low frequencies (e.g., DC signals), the intermediate inductors 145 and 150 act as shorts and allows voltages and/or currents to flow unimpeded to the other components. At higher voltage wavefronts and di/dt levels, such as during surge conditions, the inductors 145 and 150 will impede currents and develop a voltage drop, effectively enabling auxiliary surge paths to the ground 170 through the diode components at varying turn-on voltages and turn-on times and delaying the surge currents to allow the gas tube 105 time to trigger. When a leading edge of the surge 120 propagates through to the intermediate inductors 145 and 150, one or more of the diodes (e.g., the zener diodes 175 and 185 and the diodes 180 and 190) divert the portion of the surge 120 to the ground 170 rather than allowing the surge 120 to propagate to the output center conductor 110. These auxiliary surge paths operate to dissipate the surge 120 until the gas tube 105 becomes conductive and allows the surge 120 to flow to the ground 170 via the main surge path 165.

The zener diodes 175 and 185 and the diodes 180 and 190 have faster turn-on times and lower turn-on voltages compared to the gas tube 105. The diode components 180, 185 and 190 are configured for a specific turn-on voltage (e.g., 40 volts) and will conduct to the ground 170 first. Secondly, the zener diode 175 is configured to have a higher turn-on voltage (e.g., 80-90 volts) than the diode components 180, 185 and 190 and will conduct to the ground 170 at some point in time afterwards. Lastly, the gas tube 105 is configured to have an even higher turn-on voltage (e.g., 300 volts) and will conduct to the ground 170 last.

In an alternative embodiment, the gas tube 105 or the diode components (175, 180, 185 or 190) may be replaced or supplemented with a different non-linear element or surge protection element or device for dissipating the surge 120 to the ground 170 along the main surge path 165. For example, a metal oxide varistor (MOV), diode or any combination thereof may be incorporated. If the voltage at the MOV is below its clamping or switching voltage, the MOV exhibits a high resistance. If the voltage at the MOV is above its clamping or switching voltage, the MOV exhibits a low resistance. Hence, MOVs can effectively provide surge protection and are sometimes referred to as non-linear resistors due to their nonlinear current-voltage relationship.

The gas tube 105 is coupled at a first end to the first inductor 135 and at a second end to the common ground 170. The gas tube 105 has a capacitance value of about 2 pF and a turn-on voltage of between about 90 volts and about 360 volts. The selection of the turn-on voltage for the gas tube 105 is a function of the RF power of the surge protector 100. For example, a turn-on voltage of 360 volts will result in an RF power handling capacity of about 5,000 watts. Moreover, the high RF impedance provided by the first and second spiral inductors 135 and 140 allow for higher RF power to travel in the RF path 155 without turning on the gas tube 105. Hence, changing the gas tube 105 to have a different turn-on voltage affects the RF power limitations but does not affect the RF frequency range or tuning of the surge protector 100.

The gas tube 105 is isolated from (i.e. is not directly connected to) the input center conductor 109 by the first spiral inductor 135. Similarly, the gas tube 105 is isolated from the output center conductor 110 by the second spiral inductor 140 and the intermediate inductors 145 and 150. The first and second spiral inductors 135 and 140 provide RF isolation from the gas tube 105 and other components that are known to create passive inter-modulation (PIM). The incorporation of an RF high impedance element (e.g., an inductor, a quarter-wave stub, etc) between the RF path 155 and the gas tube 105 significantly reduces the amount of PIM in the RF path 155. That is, the first and second spiral inductors 135 and 140 prevent the gas tube 105 and other surge mitigation components from being directly connected to the RF path 155. The first and second spiral inductors 135 and 140 may thus be replaced with quarter-wave stubs or other RF high impedance elements to achieve a similar purpose.

Figure 2:
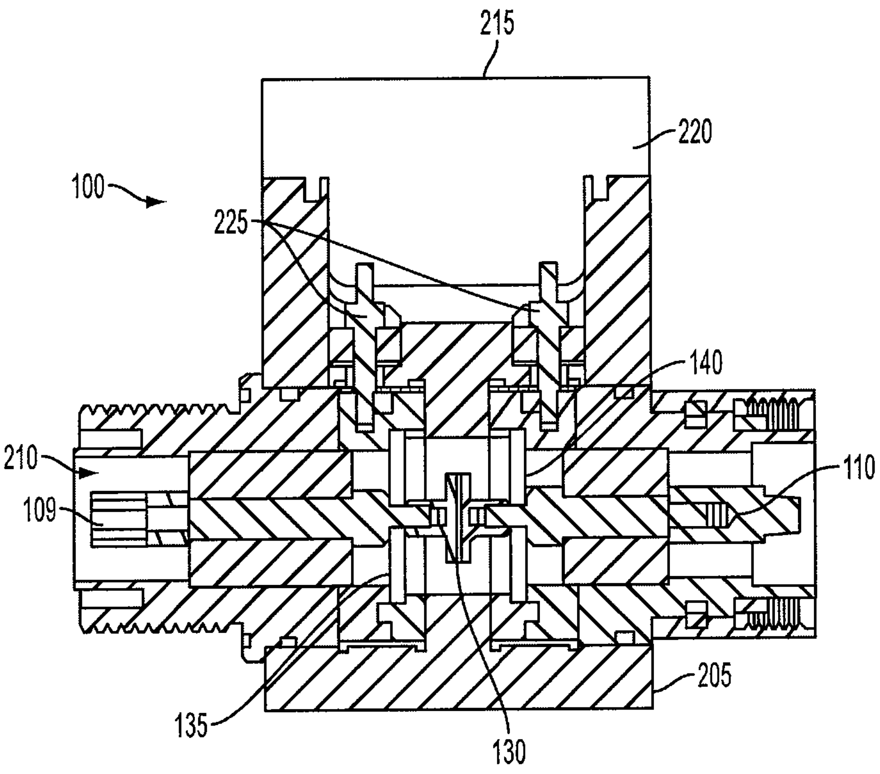
FIG. 2 is a cross-sectional view of the DC pass RF coaxial surge protector having the schematic circuit diagram shown in FIG. 1 in accordance with an embodiment of the invention.

Turning now to FIG. 2, a cross-sectional view of the DC pass RF coaxial surge protector 100 having the schematic circuit diagram of in FIG. 1 is shown. The surge protector 100 has a first housing 205 that defines a first cavity 210. The first cavity 210 is preferably formed in the shape of a cylinder and has an inner radius of approximately 432.5 mils. In an alternative embodiment, the first cavity 210 can be formed in any shape and of varying sizes. The input center conductor 109 and the output center conductor 110 are positioned concentric with and located within the first cavity 210 of the first housing 205. The surge protector 100 has a second housing 215 that extends from the first housing 205. The first housing 205 and the second housing 215 may be formed as a single housing. The second housing 215 defines a second cavity 220 for housing the electrical components 195 (see FIG. 1).

The input center conductor 109, the first spiral inductor 135, the capacitor 130, the second spiral inductor 140 and the output center conductor 110 are positioned within the first cavity 210 of the first housing 205. The input and output center conductors 109 and 110 are positioned along a central axis within this first cavity 210. The first inductor 135 is positioned along a first plane and the second inductor 140 is positioned along a second plane, the first plane being positioned substantially parallel to the second plane. In one embodiment, the central axis of the input and output center conductors 109 and 110 is positioned substantially perpendicular to the first plane and the second plane.

The first and second spiral inductors 135 and 140 have small foot print designs and may be formed with flat or planar geometries. The first and second spiral inductors 135 and 140 have values of between about 10 nanoHenries (nH) and about 25 nH with a preferred range of about 17 to 20 nH, as measured at around 100 MHz. The chosen values for the first and second spiral inductors 135 and 140 help determine the specific RF frequency ranges of operation for the surge protector 100. The diameter, surface area, thickness and shape of the first and second spiral inductors 135 and 140 can be varied to adjust the operating frequencies and current handling capabilities of the surge protector 100. In one embodiment, an iterative process may be used to determine the diameter, surface area, thickness and shape of the first and second spiral inductors 135 and 140 to meet the requirements of a particular application. In the preferred embodiment, the diameter of the first and second spiral inductors 135 and 140 of the surge protector 100 is about 0.865 inches and the thickness of the first and second spiral inductors 135 and 140 is about 0.062 inches. Furthermore, the spiral inductors 135 and 140 spiral in an outward direction.

The material composition of the first and second spiral inductors 135 and 140 helps determine the amount of charge that can be safely dissipated across the first and second spiral inductors 135 and 140. A high tensile strength material allows the first and second spiral inductors 135 and 140 to discharge or divert a greater amount of current. In one embodiment, the first and second spiral inductors 135 and 140 are made of a 7075-T6 Aluminum material. Alternatively, any material having sufficient tensile strength and conductivity for a given application may be used to manufacture the first and second spiral inductors 135 and 140. Each of the components or the housing may be plated with a silver material or a tri-metal flash plating. This reduces or eliminates the number of dissimilar or different types of metal connections or components in the RF path to improve PIM performance.

The first and second spiral inductors 135 and 140 are positioned within the first cavity 210. Each of the first and second spiral inductors 135 and 140 has an inner edge with an inner radius of approximately 62.5 mils and an outer edge with an outer radius of approximately 432.5 mils. The inner edge of the first spiral inductor 135 is coupled to the input center conductor 109 and the inner edge of the second spiral inductor 140 is coupled to the output center conductor 110. The outer edge of the first spiral inductor 135 is coupled to the gas tube 105. Similarly, the outer edge of the second spiral inductor 140 is coupled to the gas tube 105 through various electrical components 195. The first housing 205 may operate as a common ground connection to facilitate an easily accessible grounding location for the various surge mitigation elements (e.g., 105, 175, 185 and 190).

Each spiral of the first and second spiral inductors 135 and 140 spirals in an outward direction. In one embodiment, each of the first and second spiral inductors 135 and 140 has three spirals. The number of spirals and thickness of each spiral can be varied depending on the requirements of a particular application. The spirals of the first and second spiral inductors 135 and 140 may be of a particular known type such as the Archimedes, Logarithmic, Hyperbolic or any combination of these or other spiral types.

During a surge condition, the surge 120 (see FIG. 1) first reaches the inner edge of the first spiral inductor 135. The surge 120 then travels through the spirals of the first spiral inductor 135 in an outward direction from the inner edge to the outer edge. Once the surge 120 reaches the outer edge, the surge 120 is dissipated to ground through one or more of the following elements: the gas tube 105, the zener diodes 175 and 185, and/or the diodes 180 and 190 (see FIG. 1). The main portion of the surge 120 is passed across the gas tube 105 (see FIG. 1) while auxiliary portions of the surge 120 that are not diverted by the gas tube 105 are diverted to ground by the zener diodes 175 and 185 and/or the diodes 180 and 190.

With reference to FIG. 1, the electrical components 195 are mounted or integrated with a printed circuit board or a common ground base plate that is positioned within the second cavity 220 of the second housing 215 and attached to the first housing 205 or the second housing 215 with screws or other fasteners. The electrical components 195 are thus positioned within the second cavity 220 of the second housing 215 and therefore isolated from the components along the RF path 155, which are positioned within the first cavity 210 of the first housing 205. DC signals are moved out of the first cavity 210 and into the second cavity 220 via the first spiral inductor 135. Similarly, DC signals are moved back into the first cavity 210 from the second cavity 220 via the second spiral inductor 140. In an alternative embodiment, the second cavity 220 or second housing 215 may not be needed and the DC path 160 or the main surge path 165 can rather be routed to any location outside of the first cavity 210 of the first housing 205 in order to isolate them from the RF path 155 traveling within the first cavity 210.

In the preferred embodiment, one or more feed-throughs or passageways 225 are used to electrically connect elements or components in the first cavity 210 with elements or components within the second cavity 220. The feed-throughs or passageways 225 allow electrical wires or other conductive elements to pass signals from the first cavity 210 to the second cavity 220 and vice versa. For example, a first electrical wire passes through one feed-through or passageway 225 to connect the outer edge of the first spiral inductor 135 to the gas tube 105 and a second electrical wire passes through a different feed-through or passageway 225 to connect the outer edge of the second spiral inductor 140 to the intermediate inductor 150, the diodes 180 or 190 or the capacitor 148. In an alternative embodiment, more or fewer feed-throughs or passageways 225 may be used. Such a configuration allows RF signals to travel along the RF path 155 in the first cavity 210 free from interference due to the surge mitigation circuitry located in the second cavity 220.

Figure 3:
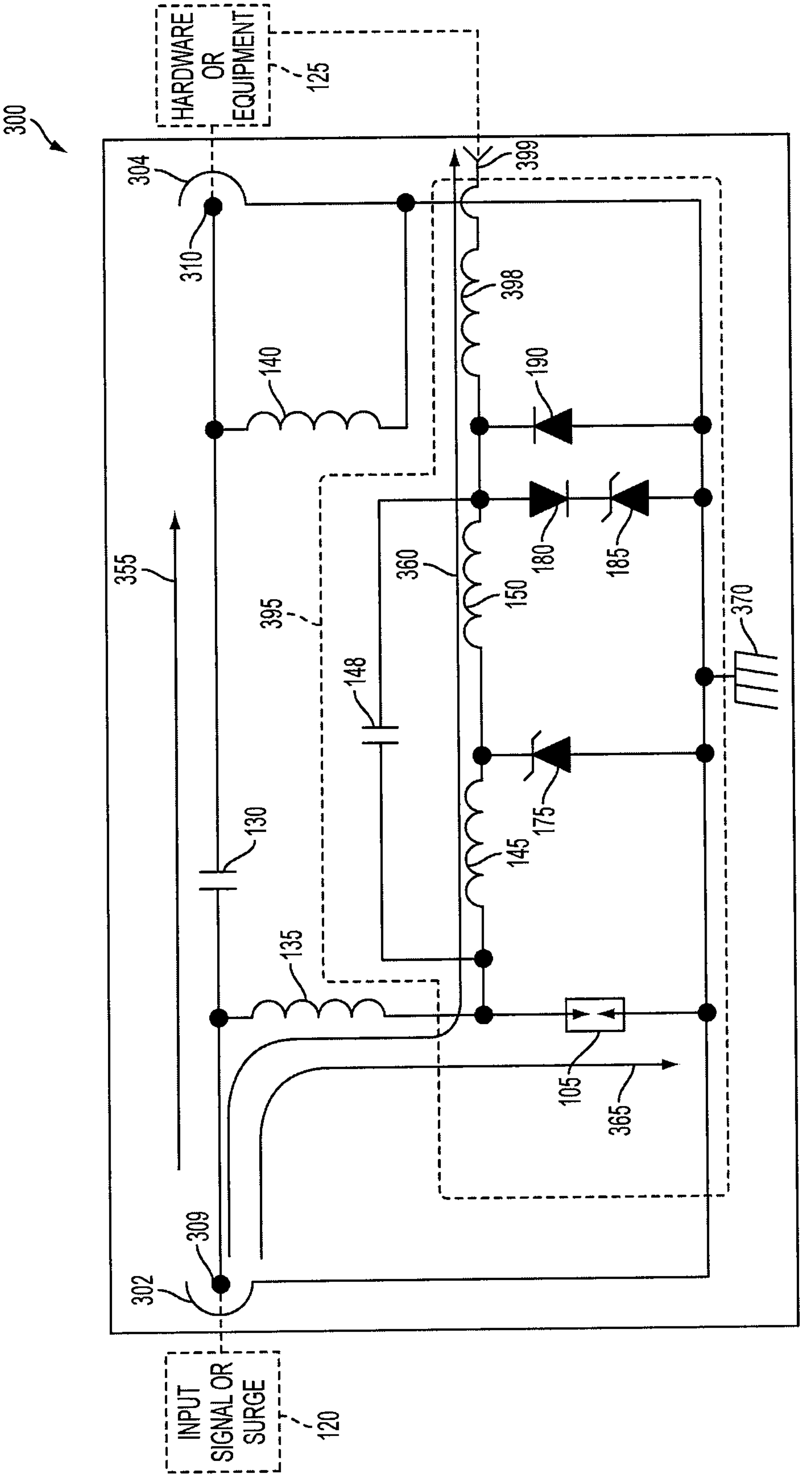
FIG. 3 is a schematic circuit diagram of a DC injector/pick-off and RF pass-through coaxial surge protector with a gas tube in accordance with an embodiment of the invention.

Turning now to FIG. 3, a schematic circuit diagram of a DC injector/pick-off and RF pass-through coaxial surge protector 300 is shown. The surge protector 300 operates to protect the hardware or equipment 125 from electrical surges in a similar fashion to the surge protector 100 described for FIG. 1 and includes an input port 302 having an input center conductor 309 and an output port 304 having an output center conductor 310. The connection at the input port 302 and the output port 304 may be a center conductor such as a coaxial line with center pins as the input center conductor 309 and the output center conductor 310 for propagating DC currents and RF signals and an outer shield that surrounds the center pins. The surge protector 300 utilizes many of the same electrical components as the surge protector 100, including the blocking capacitor 130, the first and second spiral inductors 135 and 140, the gas tube 105, the intermediate inductors 145 and 150, the capacitor 148, the zener diodes 175 and 185 and the diodes 180 and 190. Certain components are electrically connected in a different manner to create signal paths that differ from those of the surge protector 100 described in FIG. 1, as discussed in greater detail herein.

The surge protector 300 includes an RF path 355 that comprises the input center conductor 309, the capacitor 130 and the output center conductor 310. The RF path 355 operates similar to the RF path 155 described in FIG. 1. The surge protector 300 also includes a main surge path 365 for enabling the surge 120 present at the input center conductor 309 to travel and dissipate to the ground 370 instead of propagating through the surge protector 300 and to the connected hardware or equipment 125. The main surge path 365 is similar to the main surge path 165 described above for FIG. 1.

The surge protector 300, however, utilizes a different DC path 360 that does not include the second spiral inductor 140, but rather incorporates an output inductor 398 connected to the intermediate inductor 150. The DC path 360 thus includes the input center conductor 309, the first spiral inductor 135, the intermediate inductors 145 and 150, the output inductor 398 and a feed-through connector 399. The feed-through connector 399 enables a DC connection to the hardware or equipment 125. Hence, the DC path 360 is not coupled back with the RF path 355 for output, but rather remains isolated from the RF path 355. In addition, the second spiral inductor 140 is not connected to the intermediate inductor 150, the diodes 180 or 190 or the capacitor 148 as in FIG. 1, but rather is connected between the output center conductor 310 and the ground 370. Such a connection enables DC signals or surges present at the output center conductor 310 to propagate to the ground 370 through the second spiral inductor 140.

Figure 4:
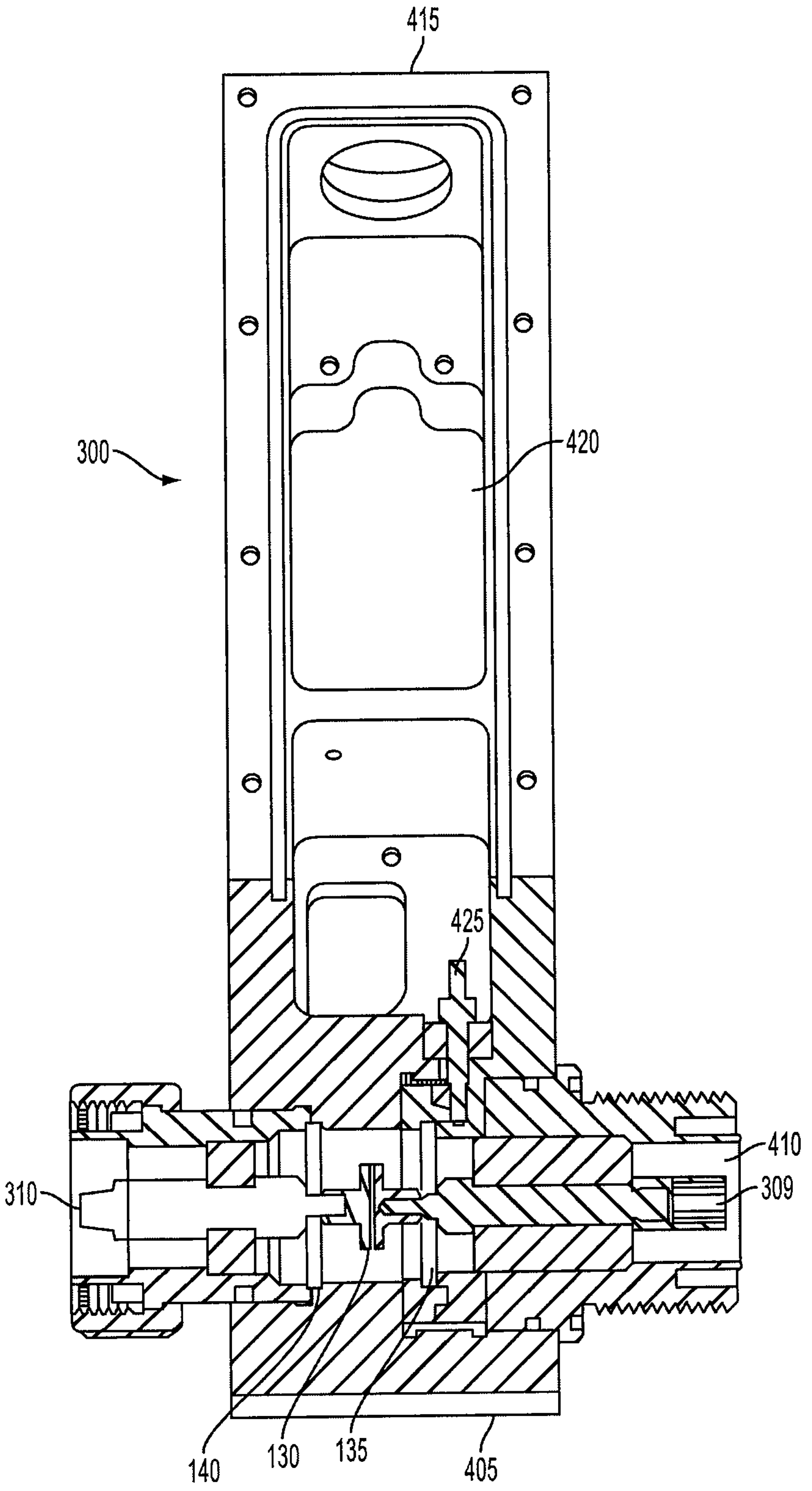
FIG. 4 is a cross-sectional view of the DC injector/pick-off and RF pass-through coaxial surge protector having the schematic circuit diagram shown in FIG. 3 in accordance with an embodiment of the invention.

FIG. 4 is a cross-sectional view of the DC injector/pick-off and RF pass-through coaxial surge protector 300 having the schematic circuit diagram shown in FIG. 3. The surge protector 300 is similar to the surge protector 100 described for FIG. 2 and incorporates many of the same electrical components. Thus, many of the sizing, geometry, orientation, material or other aspects of the surge protector 100 or its electrical component parts described above are applicable to the surge protector 300.

The surge protector 300 has a first housing 405 that defines a first cavity 410. The input center conductor 309 and output center conductor 310 are positioned concentric with and located within the first cavity 410 of the first housing 405. The surge protector 300 has a second housing 415 that extends from the first housing 405. The first housing 405 and the second housing 415 may be formed as a single housing. The second housing 415 defines a second cavity 420 for housing the electrical components 395 (see FIG. 3). In contrast to the surge protector 100 described for FIG. 2, the second housing 415 extends further outward or away from the first housing 405.

The input center conductor 309, the first spiral inductor 135, the capacitor 130, the second spiral inductor 140 and the output center conductor 310 are positioned within the first cavity 410 of the first housing 405. The input and output center conductors 309 and 310 are positioned along a central axis within this first cavity 410. The first spiral inductor 135 is positioned along a first plane and the second spiral inductor 140 is positioned along a second plane, the first plane being substantially parallel to the second plane. The central axis of the input and output center conductors 309 and 310 is positioned substantially perpendicular to the first plane and the second plane.

With reference to FIG. 3, the first and second spiral inductors 135 and 140 are designed, composed or positioned with similar configurations or materials as described above for FIG. 2. During a surge condition, the surge 120 first reaches the inner edge or radius of the first spiral inductor 135 and travels in an outward direction through the spirals of the first spiral inductor 135 to the outer edge or radius of the first spiral inductor 135. Once the surge 120 reaches the outer edge or radius of the first spiral inductor 135, the surge 120 is dissipated to ground (e.g., the housing 405) through one or more of the gas tube 105, the zener diodes 175 and 185, and/or the diodes 180 and 190.

The electrical components 395 (see FIG. 3) are mounted or integrated with a printed circuit board or a common ground base plate that is positioned within the second cavity 420 of the second housing 415 and attached to the first housing 405 or the second housing 415 with screws or other fasteners. The electrical components 395 are therefore isolated from the components along the RF path 355, which are positioned within the first cavity 410. DC signals are moved out of the first cavity 410 and into the second cavity 420 via the first spiral inductor 135. Like described above for FIG. 2, one or more feed-throughs or passageways 425 are utilized for allowing electrical wires or other conductive elements to pass signals from the first cavity 410 to the second cavity 420 and vice versa. While the surge protector 100 utilizes a plurality of feed-throughs or passageways 225 (see FIG. 2), only one feed-through 425 is used by the surge protector 300. As stated above for FIG. 2, no second housing or second cavity may be needed in an alternative embodiment, rather the electrical components 395, the DC path 360 or the main surge path 365 may be positioned outside the first cavity 410 of the first housing 405 without being contained within a second cavity or a second housing.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A DC pass RF surge protector comprising:

a housing defining a cavity therein;

a first conductor positioned in the cavity of the housing for receiving a direct current and a surge;

a second conductor positioned in the cavity of the housing;

a capacitor positioned in the cavity of the housing and electrically connected between the first conductor and the second conductor;

a first spiral inductor positioned in the cavity of the housing, the first spiral inductor having an inner edge electrically connected to the first conductor and an outer edge;

a non-linear protection device positioned outside the cavity of the housing and electrically connected to the outer edge of the first spiral inductor for dissipating the surge; and an intermediate inductor positioned outside the cavity of the housing, the intermediate inductor electrically connected to the non-linear protection device.

2. The DC pass RF surge protector of claim 1 wherein the first spiral inductor is configured to propagate the surge from the first conductor to a ground via a path outside the cavity of the housing.

3. The DC pass RF surge protector of claim 1 further comprising a second spiral inductor positioned in the cavity of the housing, the second spiral inductor electrically connected to the second conductor and wherein the first spiral inductor and the second spiral inductor are configured to propagate the direct current from the first conductor to the second conductor via a path outside the cavity of the housing.

4. The DC pass RF surge protector of claim 3 wherein the first spiral inductor is positioned along a first plane and the second spiral inductor is positioned along a second plane substantially parallel to the first plane.

5. The DC pass RF surge protector of claim 4 wherein the cavity has a central axis, the first conductor extending substantially along the central axis of the cavity and the second conductor extending substantially along the central axis of the cavity.

6. The DC pass RF surge protector of claim 5 wherein the central axis is positioned substantially perpendicular to the first plane and the second plane.

7. The DC pass RF surge protector of claim 1 wherein the non-linear protection device is selected from a group consisting of a gas tube, a metal oxide varistor, a diode, and combinations thereof.

8. The DC pass RF surge protector of claim 1 further comprising a common ground base plate positioned outside the cavity of the housing, the non-linear protection device coupled to the common ground base plate.

9. The DC pass RF surge protector of claim 1 further comprising a second non-linear protection device positioned outside the cavity of the housing, the second non-linear protection device having a different turn-on voltage or different turn-on time than the non-linear protection device.

10. A DC pass RF surge suppressor comprising:
- a first housing defining a first cavity having a central axis;
- an input conductor disposed in the first cavity of the first housing and positioned substantially along the central axis of the first cavity;
- an output conductor disposed in the first cavity of the first housing and positioned substantially along the central axis of the first cavity;
- a capacitor connected in series with the input conductor and the output conductor;
- a first spiral inductor having an inner edge connected to the input conductor and an outer edge;
- a second spiral inductor having an inner edge connected to the output conductor and an outer edge;
- a second housing defining a second cavity, the second housing connected to the first housing;
- at least one feed-through connecting the first cavity to the second cavity;
- a first surge protection element disposed in the second cavity of the second housing;
- a second surge protection element disposed in the second cavity of the second housing;
- a first conductor passing through the at least one feed-through and connecting the outer edge of the first spiral inductor to the first surge protection element; and
- a second conductor passing through the at least one feed-through and connecting the outer edge of the second spiral inductor to the second surge protection element.

11. The DC pass RF surge suppressor of claim 10 wherein an RF path is configured to travel within the first cavity of the first housing and a DC path is configured to travel from the first cavity of the first housing to the second cavity of the second housing through the first spiral inductor.

12. The DC pass RF surge suppressor of claim 11 wherein the DC path is configured to travel from the second cavity of the second housing to the first cavity of the first housing through the second spiral inductor.

13. The DC pass RF surge suppressor of claim 10 wherein the first housing, the first spiral inductor, the second spiral inductor, the second housing or the capacitor are plated with a silver material or a tri-metal flash for improving passive inter-modulation (PIM) performance.

14. The DC pass RF surge suppressor of claim 10 wherein the first spiral inductor or the second spiral inductor have a spiral selected from a group consisting of Archimedes, Logarithmic, Hyperbolic, and combinations thereof.

15. The DC pass RF surge suppressor of claim 10 further comprising a printed circuit board disposed in the second cavity of the second housing, the first surge protection element and the second surge protection element connected to the printed circuit board.

16. A DC pick-off and RF pass-through surge protector comprising:
- a housing defining a first cavity having a central axis and a second cavity, the first cavity in communication with the second cavity via a passageway;
- an input conductor disposed in the first cavity of the housing and extending substantially along the central axis of the first cavity;
- an output conductor disposed in the first cavity of the housing and extending substantially along the central axis of the first cavity;
- a capacitor disposed in the first cavity of the housing and connected in-line with the input conductor and the output conductor;
- a first spiral inductor disposed in the first cavity of the housing and having an inner radius connected to the input conductor and an outer radius;
- a second spiral inductor disposed in the first cavity of the housing and having an inner radius connected to the output conductor and an outer radius connected to the housing; a surge protection device disposed in the second cavity of the housing, the surge protection device electrically connected to the outer radius of the first spiral inductor via the passageway; and
- an output inductor disposed in the second cavity of the housing, the output inductor electrically connected to the surge protection device.

17. The DC pick-off and RF pass-through surge protector of claim 16 wherein an RF signal is configured to propagate only through the first cavity of the housing and a DC signal is configured to propagate from the first cavity of the housing to the second cavity of the housing.

18. The DC pick-off and RF pass-through surge protector of claim 17 further comprising a feed-through connector coupled to the housing and wherein the DC signal in the second cavity of the housing propagates to the feed-through connector without reentering the first cavity of the housing.

19. The DC pick-off and RF pass-through surge protector of claim 16 further comprising an electrical wire disposed within the passageway for electrically connecting the outer radius of the first spiral inductor to the surge protection device.

20. The DC pass RF surge suppressor of claim 16 wherein the first spiral inductor has three spirals or the second spiral inductor has three spirals.

* * * * *